UNITED STATES PATENT OFFICE.

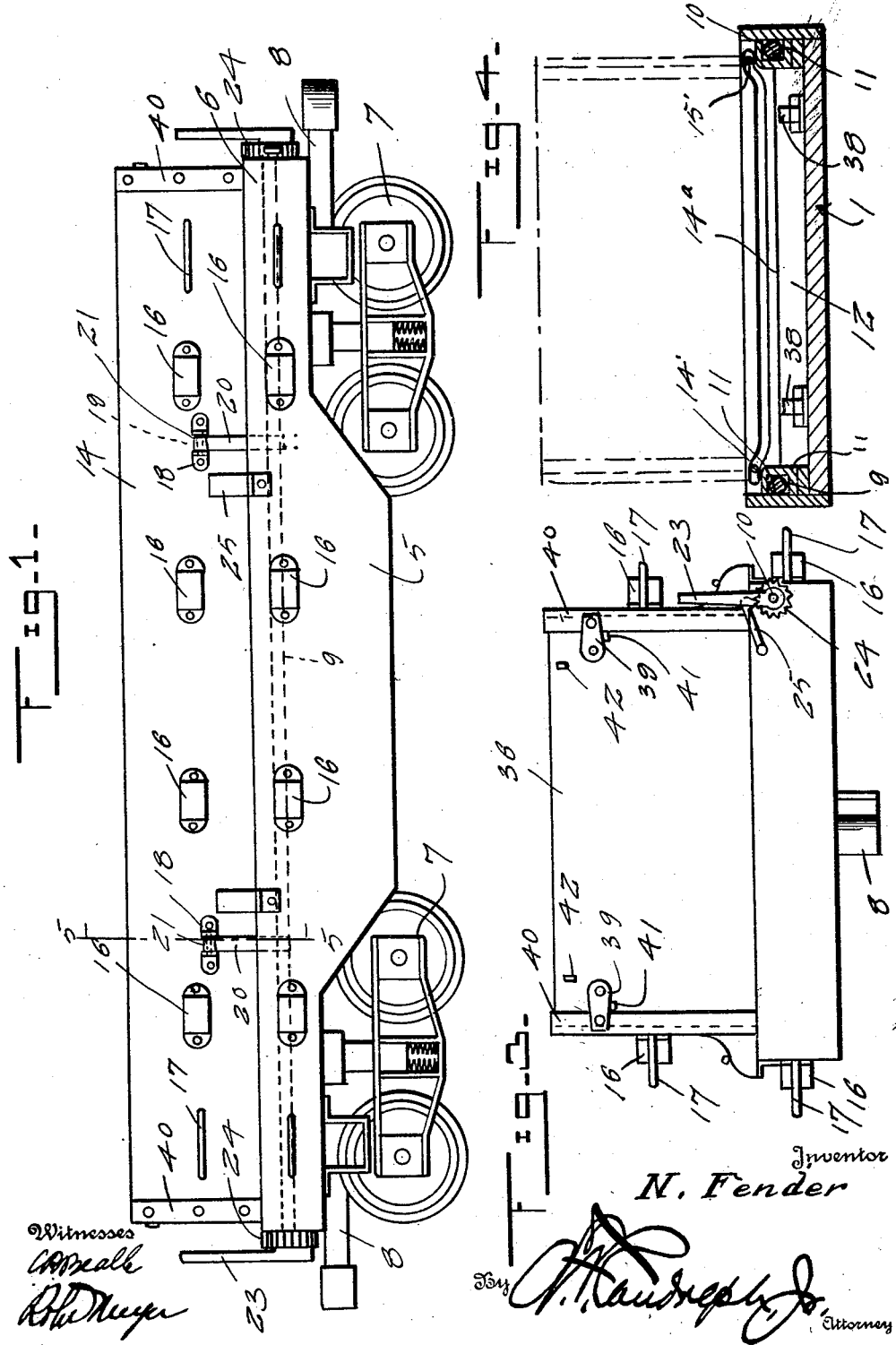

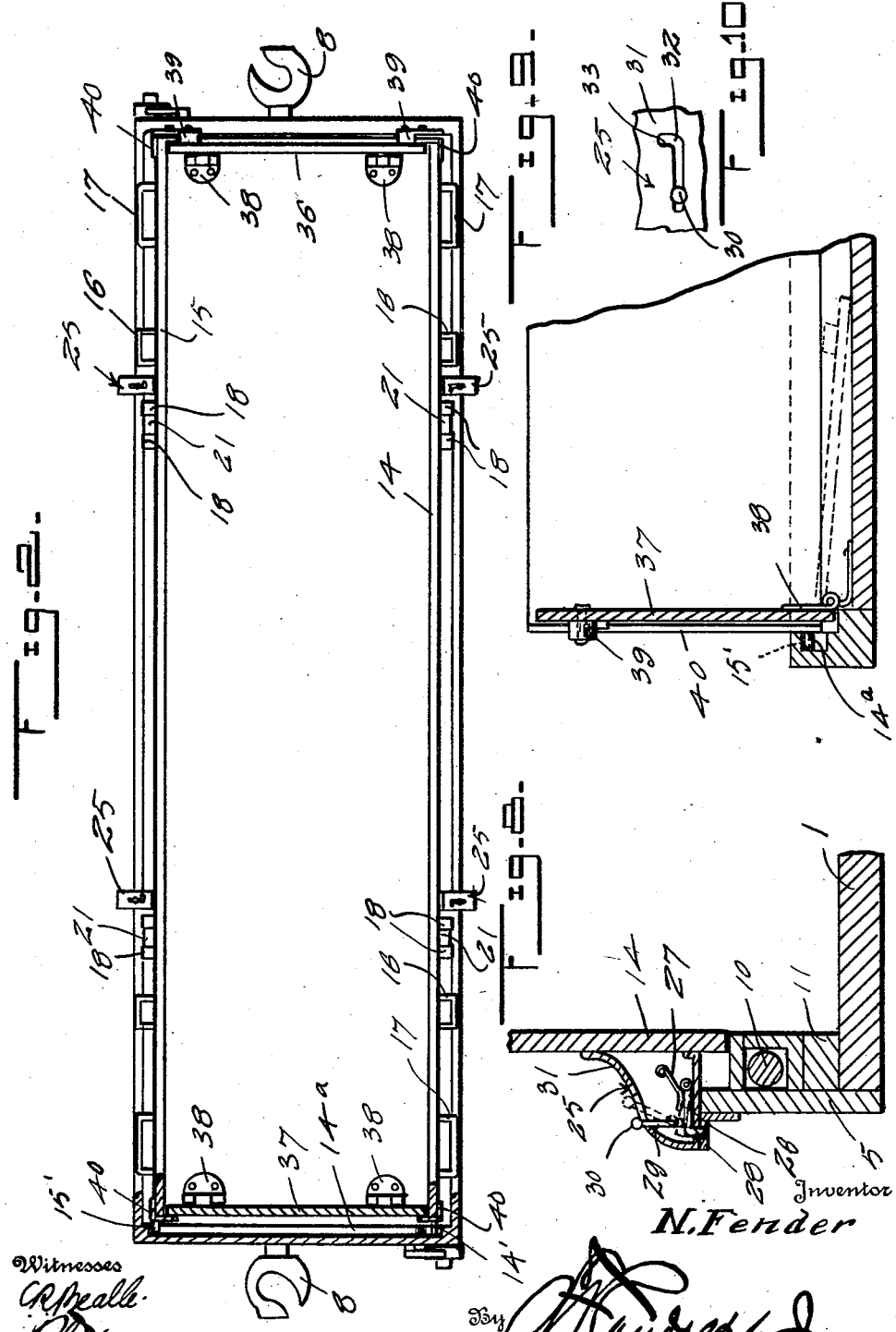

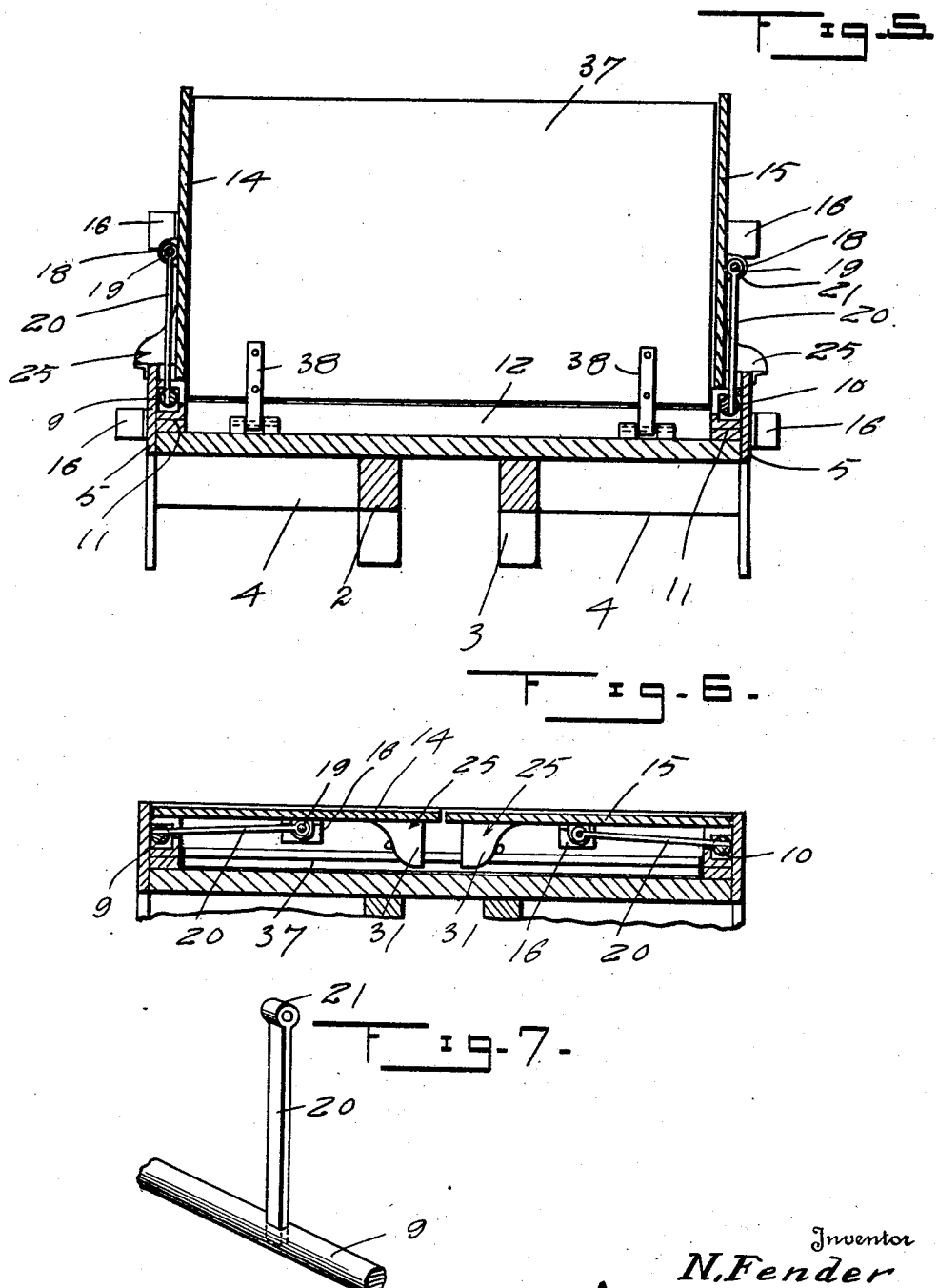

NICHOLAS FENDER, OF GARY, INDIANA.

FREIGHT-CAR.

1,275,411.     Specification of Letters Patent.     Patented Aug. 13, 1918.

Application filed September 15, 1917. Serial No. 191,565.

*To all whom it may concern:*

Be it known that I, NICHOLAS FENDER, a citizen of the United States, residing at Gary, in the county of Lake and State of Indiana, have invented certain new and useful Improvements in Freight-Cars; and I do hereby declare the following to be a full, clear, and exact description of the invention, such as will enable others skilled in the art to which it appertains to make and use the same.

This invention relates to freight cars used on railways and the primary object of the invention is to provide a car which can be converted from a flat car to a "gondola" car when desired, or from a gondola car to a flat car.

More specifically, the object of this invention is to provide a freight car including a supporting structure mounted upon the usual type of trucks, which forms the bottom for "gondola" cars and which has a pair of shafts extending longitudinally along each side of the frame to which are connected a pair of side boards, which side boards may be moved by the rotation of the shaft into a flat horizontal position for forming a bottom for a flat car or into a vertical position along each side of the supporting bottom of the car to form the sides of the "gondola" car and further to provide means for locking the sides in a vertical position and also to provide end gates which are hingedly connected to the supporting structure of the car for movement into vertical position.

A further object of the invention is to provide a car having the supporting structure or bottom of the same cut away to form a pocket for receiving the end gates and the stake sockets which are carried by the side boards when the end gates and side boards are in a folded position to form flat cars.

With the foregoing and other objects in view this invention consists in certain novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views and in which:

Figure 1 is a side elevation of the improved car,

Fig. 2 is a top plan of a car having parts broken away,

Fig. 3 is an end view of a part of the car,

Fig. 4 is a detail fragmentary section through a part of the car illustrating the side board guiding means, Fig. 5 is a vertical cross section through the car showing the end gate and side boards in their vertical operative position and taken on the line 5—5 of Fig. 1, Fig. 6 is a section similar to Fig. 5 showing the side boards and end gates in folded position, Fig. 7 is a fragmentary perspective view of one of the side board operating shafts showing the bar which connects the shaft to the side boards, Fig. 8 is an enlarged section showing one of the locks for holding the side boards in their vertical position.

Fig. 9 is a vertical section through one of the end gates and a fragment of the car, and Fig. 10 is a detail view of a part of a lock structure.

Referring more particularly to the drawings, 1 designates the base or bottom of the car, which is braced by a pair of centrally disposed longitudinally extending sills 2 and 3. These sills 2 and 3 are positioned short distances from the longitudinal center of the bottom 1 as clearly shown in Fig. 5 and they are braced by transversely extending braces 4 which are positioned at spaced intervals along the car bottom. The sills 2 and 3 and the cross braces 4 are provided for bracing or strengthening the car structure in lieu of the usual brace and sill structures employed for flat or gondola cars.

The bottom 1 also has side boards 5 attached to its edges which boards are relatively wide intermediate of their ends, and taper upwardly toward the narrow end portions 6. The car bottom 1 has the usual form of trucks 7 attached thereto and also the usual type of draw bars 8.

A pair of shafts 9 and 10 extend longitudinally along the sides of the bottom 1 and they are seated in pockets formed in the upstanding portions 11 of the car bottom 1. The upstanding portions 11 extend longitudinally along the interior of the car bottom and form pockets while their upper edges form supports upon which the lower edges of the sides 14 and 15 rest when these side boards are in their vertical position.

The side boards 14 and 15 have the usual stake sockets 16 attached to their outer surfaces, and also the usual hand holds or ladder rungs 17, as is ordinary in the construction of gondola cars. The side boards 14 and 15 have a plurality of pairs of angle irons 18 attached thereto in spaced relation which support pins 19. The upper ends of metallic bars 20 are provided with heads 21, which heads are pivotally mounted upon the pins 19. The lower ends of the bars 20 are connected with the shafts 9 and 10 so that when the shafts are rotated, the lower edges of the side boards 14 and 15 will be swung inwardly and will be moved into horizontal position as shown in Fig. 6 of the drawings for providing a flat surface, at which time the cars may be used as an ordinary flat car. The shafts 9 and 10 have hand levers 23 mounted upon their ends for rotating the shaft and they also have ratchet wheels 24 carried thereby which are engaged by pawls 25. The pawls 25 are pivotally connected to the ends of the body 1 and engage the peripheral teeth of the ratchet wheel 24 for preventing accidental rotation of the shaft. When the side boards 14 and 15 are in a folded or horizontal position, the outer surface of their upper edges will rest upon the upper surface of the upstanding portions 11.

Suitable lock structures generically indicated by the numeral 25 are carried by the side boards 14 and 15 near their lower edges and these locking structures comprise pivotally mounted locking bolts 26 which are controlled by means of flat springs 27 and which, when the side boards 14 and 15 are moved into vertical position move into suitable receiving openings in the keeper plates 28 which are carried by the upper edges of the sides 5 of the car. An operating rod 29 is connected to each of the locking bolts 26 and it has a head 30 formed thereon which is positioned exteriorly of the casing 31 which incloses the lock structure. The casing 31 is provided with a bayonet slot 32 in which the operating rod or pin 29 moves so that when the operating rod 29 is moved into the angled end 33 of the bayonet slot 32, the locking bolt 26 will be held in an inoperative position.

End gates or end boards 36 and 37 are connected by means of the hinges 38 to the inner surface of the bottom 1 of the car structure and latches 39 are pivotally carried thereby which engage metallic angle plates 40. The angle plates 40 are attached to the ends of the side boards 14 and 15. Suitable stops 41 and 42 are provided for limiting pivotal movement of the latch 39. The end boards 36 and 37 fall downwardly within the pocket 12 and the end of the side boards 14 and 15 rest upon the upper surfaces of the end boards when the side boards are in their folded position.

The lock casing 31 forms support for the intermediate portions of the side boards when the latter is in a folded position, as clearly shown in Fig. 6 of the drawings.

When it is desired to use the improved freight car as a gondola car, the shafts 9 and 10 are rocked or rotated through the medium of the hand levers 23 for moving the side boards 14 and 15 into vertical positions and owing to the fact that the bars 20 are connected to the side boards substantially equi-distant of the upper and lower edges, the smooth surfaces of the side boards, or the ones which are positioned downwardly when the latter are in a folded position will be moved outwardly as clearly shown in Fig. 5 of the drawings. After the side have reached the limit of their outward movement the springs 27 will force the locking bolts 26 into the keeper openings 28 and lock the sides in vertical position against accidental swaying movement during the travel of the car and the pawls 25 are also moved so that they will engage the peripheral teeth of the ratchet wheels 24 for further preventing accidental movement of the side boards. After the side boards have been moved to their proper vertical position the end boards 37 and 36 are manually moved into vertical position and the latches 39 are moved for engagement with the angle plates 40 which will hold the end boards against inward movement while the angle plates will hold them against outward movement.

To change the car from a gondola car into a flat car, it is necessary to manually release all of the locking bolts 27 through the medium of the pin 29, to lower the end boards into their downward substantially horizontal position, and to rotate the shafts 9 and 10 for swinging the side boards 14 and 15 inwardly into the horizontal position as shown in Fig. 6, which will present their smooth surfaces upwardly and form a flat bottom for the car.

The inner surfaces of the ends of the bottom 1 are provided with slots 14ª which receive pins 14′ and 15′ carried by the sides 14 and 15. The pins traveling in the slots guide the movement of the sides 14 and 15.

From the foregoing description taken in connection with the accompanying drawings the advantages of construction and the method of operation of the improved freight car will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:

1. In a freight car structure, a supporting base, a pair of shafts extending longitudinally along the sides of the base and upon the upper surface thereof, a pair of side boards connected to said shafts whereby when said shafts are rotated the side boards will be moved into vertical or horizontal position, and end gates hingedly connected to said car bodies for coaction with said sides for converting the car into either a gondola car or a flat car.

2. In a freight car structure, a body provided with a recessed upper surface, a pair of shafts extending longitudinally along each side of said recessed body, a plurality of bars attached to said shafts at spaced intervals, side boards, said bars being pivotally connected to said side boards substantially equi-distant of their upper and lower edges whereby when said shafts are rotated said side boards will be swung inwardly and downwardly into horizontal positions, and have their normally inner surfaces positioned upwardly for forming the flat upper surface to the car body, and end gates hingedly connected to said body and adapted to fold inwardly into the recess formed in the upper surfaces of the body beneath said side boards when the latter are in a folded position.

3. In a freight car structure, a body provided with a recessed upper surface, a pair of shafts extending longitudinally along each side of said recessed body, a plurality of bars attached to said shafts at spaced intervals, side boards, said bars being pivotally connected to said side boards substantially equi-distant of their upper and lower edges whereby when said shafts are rotated said side boards will be swung inwardly and downwardly into horizontal positions, and have their normally inner surfaces positioned upwardly for forming the flat upper surface of the car body, end gates hingedly connected to said body and adapted to fold inwardly into the recess formed in the upper surfaces of the body beneath said side boards when the latter are in a folded position, pins carried by the ends of side boards, slots formed in the inner ends of said recessed body, said pins traveling in said slots for guiding the movement of said side boards into horizontal or vertical positions.

4. In a freight car structure, a body provided with a recessed upper surface, a pair of shafts extending longitudinally along each side of said recessed body, a plurality of bars attached to said shafts at spaced intervals, side boards, said bars being pivotally connected to said side boards substantially equi-distant of their upper and lower edges whereby when said shafts are rotated said side boards will be swung inwardly and downwardly into horizontal positions, and have their normally inner surfaces positioned upwardly for forming the flat upper surface of the car body, end gates hingedly connected to said body and adapted to fold inwardly into the recess formed in the upper surfaces of the body beneath said side boards when the latter are in a folded position, pins carried by the ends of side boards, slots formed in the inner ends of said recessed body, said pins traveling in said slots for guiding the movement of said side boards into horizontal or vertical positions, and means carried by said car body and said shafts for inter-engagement for preventing accidental rotation of the shafts.

5. In a freight car structure, a body provided with a recessed upper surface, a pair of shafts extending longitudinally along each side of said recessed body, a plurality of bars attached to said shafts at spaced intervals, side boards, said bars being pivotally connected to said side boards substantially equi-distant of their upper and lower edges whereby when said shafts are rotated said side boards will be swung inwardly and downwardly into horizontal positions, and have their normally inner surfaces positioned upwardly for forming the flat upper surface of the car body, and end gates hingedly connected to said body and adapted to fold inwardly into the recess formed in the upper surface of the body beneath said side boards when the latter are in a folded position, pins carried by the ends of side boards, slots formed in the inner ends of said recessed body, said pins traveling in the slots for guiding the movement of said side boards into horizontal or vertical positions, means carried by said car body and said shaft for inter-engagement for preventing accidental rotation of the shaft, and angle plates attached to the ends of said side boards for limiting the outward hinged movement of the said end gates and means carried by said end gates for engagement with angle plates for locking the end gates against accidental movement.

6. In a freight car structure, a body provided with a recessed upper surface, a pair of shafts extending longitudinally along each side of said recessed body, side boards, means connecting said side boards and said shafts whereby when said shafts are rotated said side boards will be swung inwardly and downwardly into a horizontal position and have their normally inner surfaces positioned upwardly for forming the flat upper surface to the car body.

7. In a freight car structure, a body provided with a recessed upper surface, a pair of shafts extending longitudinally along each side of said recessed body, side boards, means connecting said side boards and said shafts whereby when said shafts are rotated said side boards will be swung inwardly and downwardly into a horizontal position and have their normally inner surfaces positioned upwardly for forming the flat upper surface of the car body, and means carried by said car body and said shafts for inter-engagement to prevent accidental rotation of the shafts.

8. In a freight car structure, a body provided with a recessed upper surface, a pair of shafts extending longitudinally along each side of said recessed body, a plurality of bars attached to said shaft at spaced intervals, side boards, said bars being pivotally connected to said side boards substantially equi-distant to their upper and lower edges whereby when said shafts are rotated the side boards will be swung inwardly and downwardly into horizontal positions, and have their normally inner surfaces positioned upwardly for forming the flat upper surface of the car body, end gates hingedly connected to said body and adapted to fold inwardly into the recess formed in the upper surface of the body beneath said side boards when the latter are in folded position, angled plates attached to the ends of said side boards for limiting the outward hinged movement of said end gate, and means carried by said end gates for engagement with said angle plate for locking the end gates against accidental movement.

9. In a freight car structure, a body provided with a recessed upper surface, a pair of shafts extending longitudinally along the sides of said recessed body, a plurality of bars attached to said shafts at spaced intervals, side boards, said bars being pivotally connected to said boards substantially equi-distant of their upper and lower ends whereby when said shafts are rotated said side boards will be swung inwardly and downwardly into horizontal positions, pins carried by the ends of said side boards, slots formed in the inner ends of said recessed body, said pins traveling in said slots for guiding the movement of said side boards into horizontal or vertical positions, and means carried by said car body and said shafts for inter-engagement to prevent accidental rotation of the shafts.

In testimony whereof I affix my signature in presence of two witnesses.

NICHOLAS FENDER.

Witnesses:
FRED FENDER,
JOHN F. POPE.

Copies of this patent may be obtained for five cents each, by addressing the "Commissioner of Patents, Washington, D. C."